(12) United States Patent
Kauffman, II et al.

(10) Patent No.: US 10,893,655 B2
(45) Date of Patent: Jan. 19, 2021

(54) DISPOSABLE CAT LITTER BOX

(71) Applicants: Porter W. Kauffman, II, Greenville, NC (US); Chad R. Kauffman, Wooster, OH (US)

(72) Inventors: Porter W. Kauffman, II, Greenville, NC (US); Chad R. Kauffman, Wooster, OH (US)

( * ) Notice: Subject to any disclaimer, the term of this patent is extended or adjusted under 35 U.S.C. 154(b) by 233 days.

(21) Appl. No.: 16/109,116

(22) Filed: Aug. 22, 2018

(65) Prior Publication Data
US 2019/0059317 A1 Feb. 28, 2019

Related U.S. Application Data

(60) Provisional application No. 62/549,039, filed on Aug. 23, 2017.

(51) Int. Cl.
*A01K 1/00* (2006.01)
*A01K 1/01* (2006.01)

(52) U.S. Cl.
CPC .................. *A01K 1/0125* (2013.01)

(58) Field of Classification Search
CPC .................. A01K 1/00; A01K 1/0157
USPC .......................................... 119/161
See application file for complete search history.

(56) References Cited

U.S. PATENT DOCUMENTS

| | | | | |
|---|---|---|---|---|
| 4,624,380 A | * | 11/1986 | Wernette | A01K 1/0125 119/168 |
| 4,782,788 A | * | 11/1988 | Arcand | A01K 1/0125 119/168 |
| 4,813,376 A | * | 3/1989 | Kaufman | A01K 1/0125 119/168 |
| 4,846,103 A | * | 7/1989 | Brown | A01K 1/0125 119/168 |
| 4,846,105 A | * | 7/1989 | Caldwell | A01K 1/0125 119/168 |
| 4,940,016 A | * | 7/1990 | Heath | A01K 1/0125 119/168 |
| 4,967,692 A | * | 11/1990 | Mills | A01K 1/0125 119/168 |
| 4,976,218 A | * | 12/1990 | Cirami | A01K 1/0125 119/168 |
| 4,981,104 A | * | 1/1991 | Goodwin | A01K 1/0125 119/168 |
| 5,014,649 A | * | 5/1991 | Taft | A01K 1/0125 119/168 |
| 5,035,205 A | * | 7/1991 | Schiller | A01K 1/0125 119/165 |
| 5,078,099 A | * | 1/1992 | Balson | B65D 5/3642 119/168 |
| 5,178,100 A | * | 1/1993 | Monk | A01K 1/0125 119/168 |
| 5,203,282 A | * | 4/1993 | Hasiuk | A01K 1/0125 119/168 |
| 5,465,686 A | * | 11/1995 | Monetti | A01K 1/033 119/168 |
| 5,572,951 A | * | 11/1996 | Evans | A01K 1/0125 119/168 |

(Continued)

*Primary Examiner* — Richard T Price, Jr.
(74) *Attorney, Agent, or Firm* — Coats & Bennett, PLLC

(57) ABSTRACT

A cat litter box is designed to be folded into a compact form for storage and shipment to a customer and unfolded by the customer for use. When it is time to replace the litter box, the cat litter box can be refolded back into a compact form for disposal. A lid 40 protects the box during storage and shipment.

20 Claims, 9 Drawing Sheets

(56) References Cited

U.S. PATENT DOCUMENTS

| | | | | |
|---|---|---|---|---|
| 5,727,499 A | * | 3/1998 | Armington | A01K 1/0125 |
| | | | | 119/168 |
| 5,730,085 A | * | 3/1998 | Santoiemmo | A01K 1/0125 |
| | | | | 119/168 |
| 5,845,601 A | * | 12/1998 | Robinson | A01K 1/0125 |
| | | | | 119/168 |
| 2011/0180008 A1 | * | 7/2011 | Davis | B65F 1/0006 |
| | | | | 119/166 |
| 2012/0234252 A1 | * | 9/2012 | Donta | A01K 1/0125 |
| | | | | 119/168 |

* cited by examiner

DISPOSABLE CAT LITTER BOX

RELATED APPLICATIONS

This application claims benefit of U.S. Provisional Application No. 62/549,039 titled DISPOSABLE CORRUGATED LITTER BOX WITH POLYMER LINER & SILICA GEL CAT LITTER filed Aug. 23, 2017, which is incorporated herein in its entirety by reference.

TECHNICAL FIELD

The present invention relates generally to cat litter boxes and, more particularly, to a disposable cat litter box with a corrugated cardboard construction.

BACKGROUND

Cat litter was developed for the purpose of allowing humans to share a living space with their cat. The invention of cat litter created a cohabited space for humans and cats but also created two significant challenges most cat owners experience: finding ways to eliminate odor from the litter box, and managing the waste created by cats. Regular replenishment of fresh litter is required for hygiene purposes, and cat owners must properly dispose of soiled litter. Both activities are time consuming and unfavorable experiences for most cat owners. Typical cat litter available in today's retail establishments are heavy, awkward to handle and inconvenient for transporting home.

SUMMARY

A disposable cat litter box is designed to be folded into a compact form for storage and/or shipment to a customer. The cat litter box is prepacked with a predetermined amount of cat litter. The box is unfolded by the customer for use. When it is time to replace the cat litter box, it is refolded back into a compact form for disposal.

The cat litter box comprises a box and a cat litter tray. The box includes a bottom and side walls extending upwardly from the bottom to form a litter compartment. The cat litter tray is shaped to conform to the interior space of the litter compartment and includes an outer periphery that is sealed to the inner surfaces of the side walls. Extension panels hingedly connect to respective side walls and are configured to move between a folded position in which the litter compartment is enclosed by the extension panels and an unfolded position in which the extension panels extend upward from the side walls to form an extended litter compartment. An opening or cut-out in one of the extension panels provides means for ingress into and egress out of the assembled cat litter box by a cat. In some embodiments, the box may include a lid to protect the box during storage and shipment.

In one exemplary embodiment, the box is manufactured from single wall "B flute" material. The interior and exterior surfaces of the box are protected from cat urine and moisture damage by applying a water-resistant coating that is not easily penetrated by water, i.e. water repellant, or is impervious to water, i.e. water-proof. A heat-activated adhesive coating is applied over the water-resistant coating on the interior of the side walls for adhering the cat litter tray to the interior of the box. The cat litter tray and box are then placed on a mold while heat and pressure are simultaneously applied to the outer surfaces of the box. The pressure ensures that good contact is made between the cat litter tray and the side walls of the box while heat is simultaneously transferred through the box material to activate the adhesive.

DETAILED DESCRIPTION

Figure 1:
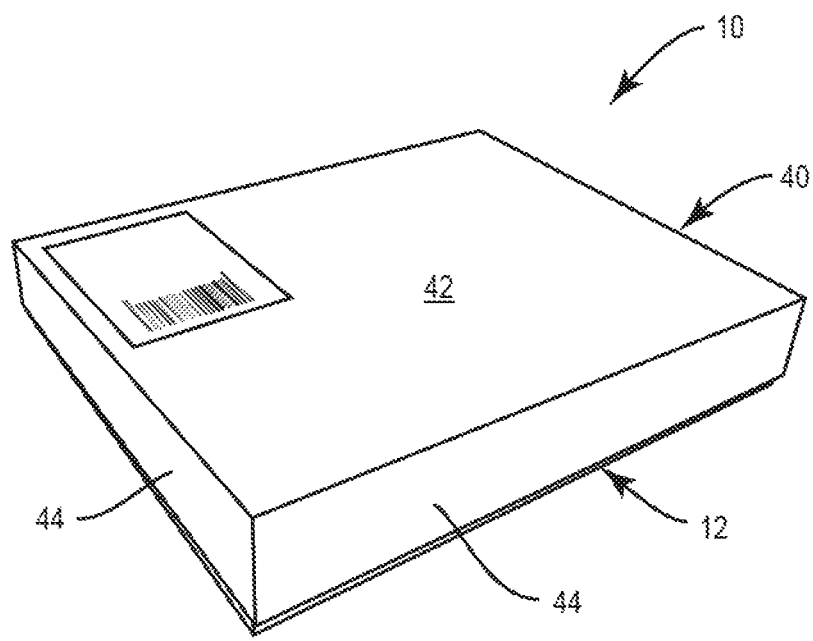
FIG. 1 is a perspective view of the cat litter box in a folded configuration with the lid in place.

Referring now to the FIGS. 1-5, a disposable cat litter box according to one embodiment is shown and indicated generally by the numeral 10. The main components of the cat litter box 10 comprise a box 12, a lid 40 for the box 12, and a cat litter tray 50 disposed inside the box 12. The cat litter box 10 is designed to be folded into a compact form for storage and shipment to a customer and unfolded by the customer for use. When it is time to replace the cat litter box 10, the cat litter box 10 can be folded back into a compact form for disposal. The lid 40 protects the box 12 during storage and shipment.

Figure 2:
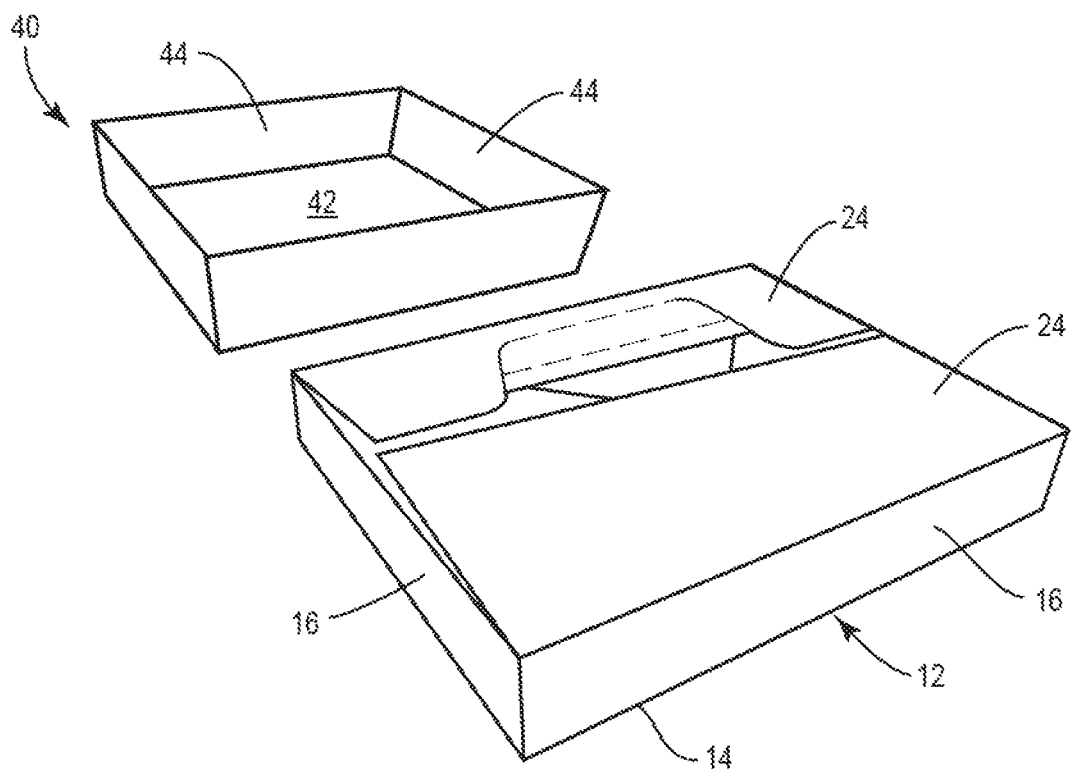
FIG. 2 is a perspective view of the cat litter box in a folded configuration with the lid removed.
Figure 5:
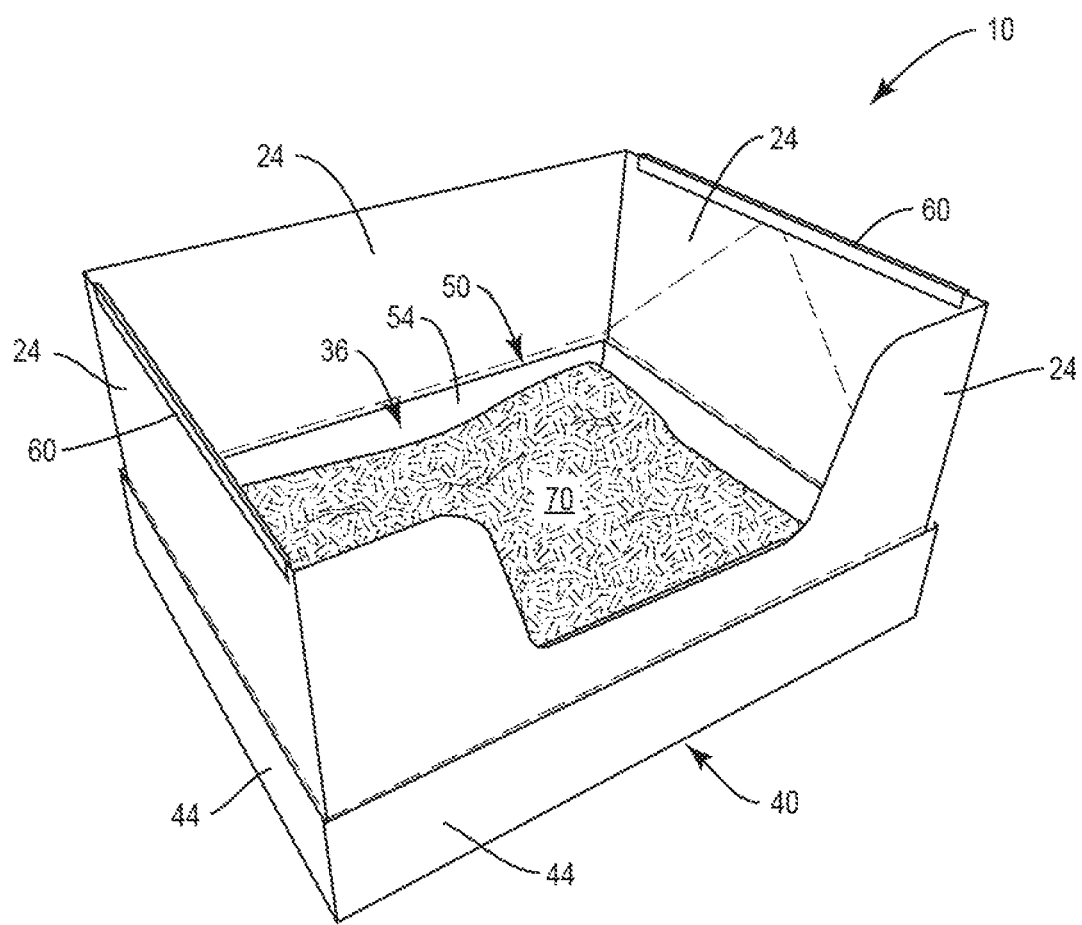
FIG. 5 is a perspective view of the cat litter box fully assembled for use with the extension panels unfolded and locked.
Figure 6:
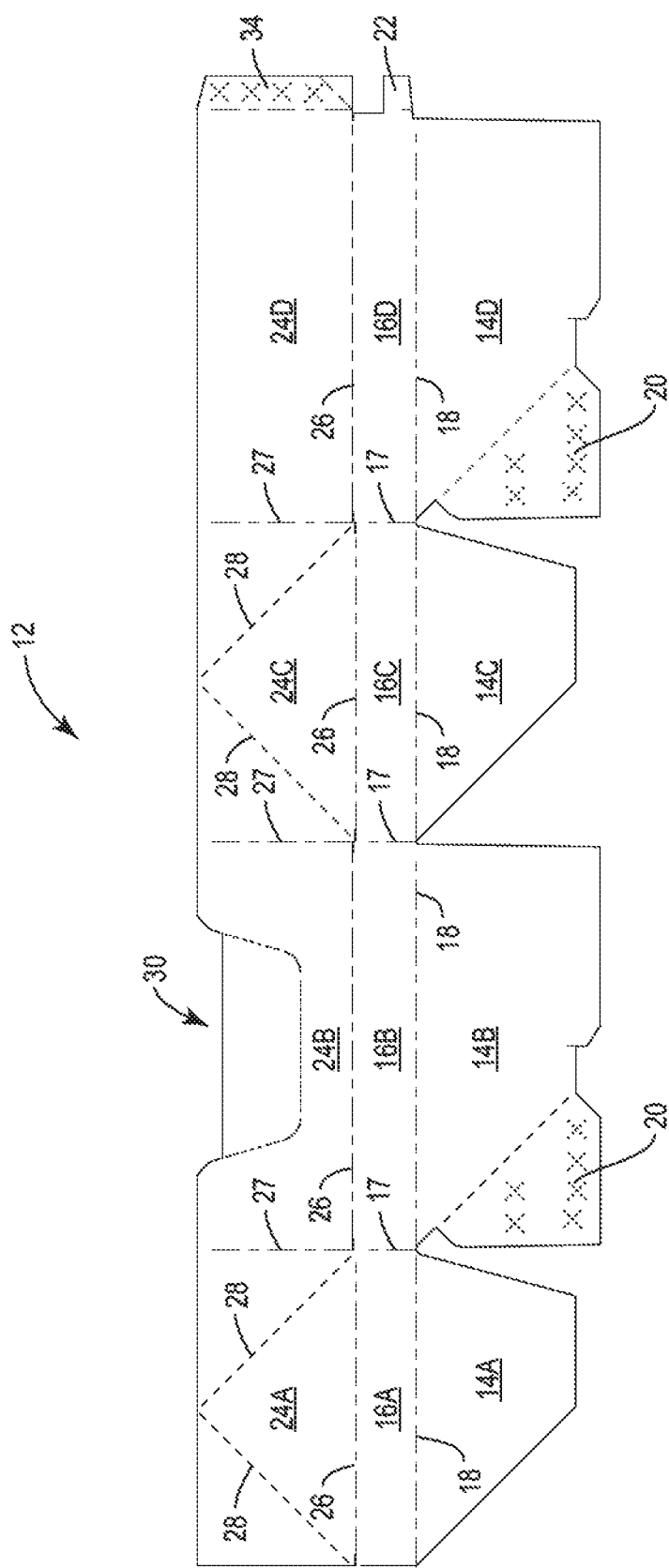
FIG. 6 is a plan view of a cardboard blank from which a box for use in the cat litter box is constructed.

In one embodiment, the box 12 is generally rectangular in form and preferably constructed of cardboard, though other materials could be used in some embodiments. The box 12 comprises a bottom indicated generally by the numeral 14, side walls indicated generally by the numeral 16, and extension panels indicated generally by the numeral 24. The bottom 14 is formed by four bottom panels indicated individually by the reference numerals 14A-14D as seen in FIG. 6. An adhesive 20 is applied to a portion of bottom panels 14B and 14D that overlap with bottom panels 14A and 14C respectively when the box 12 is assembled. The side walls 16, indicated individually by reference numerals 16A-16D, join respective bottom panels 14A-14D along horizontal fold lines 18. The side walls 16A-16D also join along corner fold lines 17. Side wall 16D includes a tab 22 that overlaps with and attaches to side wall 16A when the box 12 is assembled to join side walls 16A and 16D at the corner of the box 12. The bottom 14 and sidewalls 16 together define a litter compartment 36 inside the box 12 when the box 12 is assembled. Extension panels 24, indicated individually by reference numerals 24A-24D, join respective side walls 16A-16D along horizontal fold lines 26. Extension panels 24A-24D join along corner fold lines 27. Extension panel 24D includes a tab 34 that overlaps with and attaches to extension panel 24A when the box 12 is assembled to join extension panels 24A and 24D at the corner of the box 12. The extension panels 24 are moveable between a folded position as shown in FIG. 2 and an unfolded position as shown in FIG. 5. Extension panels 24A and 24C include diagonal fold lines 28 that enable the extension panels 24A and 24C to fold inwardly while joined at the corners with extension panels 24B and 24D. Extension panel 24B includes a perforated cut-out 30 that when removed provides an opening for a cat to enter into and exit from the litter compartment 36 when the cut-out is removed by the user.

The lid 40 of the cat litter box 10 is also rectangular in form and conforms to the shape of the box 12. The lid 40 includes a top 42 and side walls 44 that extend down from the top 42. The top 42 and side walls 44 are sized to fit over the side walls 16 of the box 12 when the extension panels 24 are in the folded position as shown in FIG. 2. FIG. 1 illustrates the lid 40 fitted over the box 12.

Figure 7:
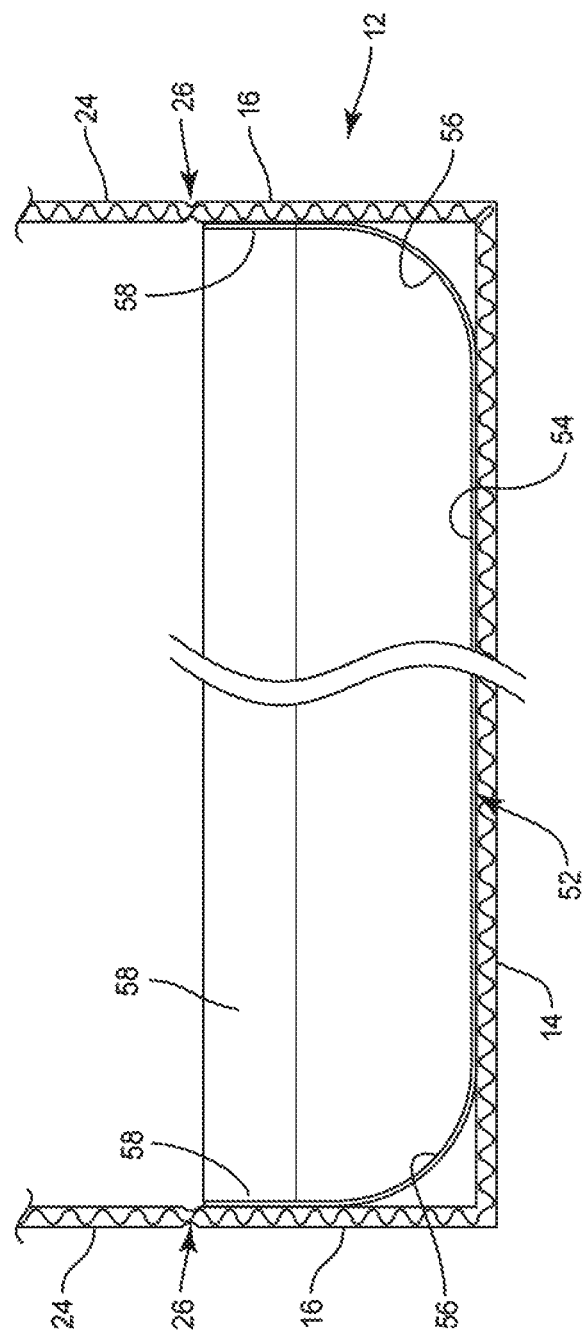
FIG. 7 is a partial section view illustrating an exemplary method for adhering the cat litter tray to the interior of a box used in to make the cat litter box.

The cat litter tray 50 is disposed inside the litter compartment 36 defined by the bottom 14 and side walls 16 of the box 12. In one embodiment, the cat litter tray 50 is made of a polymer and molded to conform in size and shape to the interior of the litter compartment 36. The cat litter tray 50 comprises a tray 52 having flanges 58 that extend from the outer periphery of the tray 52. The tray 52 includes a bottom 54 and curved side walls 56 to hold cat litter. Flanges 58 extend from the outer periphery of the tray 52 for securing the cat litter tray 50 inside the litter compartment 36 and providing protection from cat urine to the portion of the extension panels 24 immediately above top of the tray 52. When the cat litter tray 50 is disposed in the litter compartment 36, the flanges 58 extend upwardly from the outer periphery of the tray portion 52. The flanges 58 lie flat against the inner surfaces of the side walls 16 of the box 12 and are sealed to the side walls 16 by an adhesive as shown in FIG. 7. For example, the flanges 58 of the cat litter tray 50 can be sealed to the inner surfaces of the side walls 16 by a double-sided adhesive tape, or by an adhesive coating applied to the inner surfaces of the side walls 16.

The reinforcing strips 60 provide structural support for and protect the top edges of the extension panels 24A and 24C when the cat litter box 10 is assembled for use. Similar protective strips (not shown) could also be applied to the top edges of the extension panels 24B and 24D for protection of the top edges. The reinforcing strips 60 in one embodiment comprise extruded polymer strips with an inverted u-shaped cross section configured to slide onto the top edges of the extension panels 24.

In one embodiment, the box 12 and lid 40 are manufactured from single wall "B flute" material. The height of the extension panels 24 helps keep the litter contained within the litter compartment during use. An entrance opening into the cat litter box 10 for the cat measures, in one embodiment 11" W×5½"H so that a cat can easily enter into and exit from the litter compartment when the cat litter box 10 is in use. The lid 40 can be placed on the bottom 14 of the box 12 during use as shown in FIG. 5, or alternatively be placed over the extension panels 24 to cover the extended litter compartment during use.

The interior surfaces of the box 12 can be protected from cat urine and moisture damage by applying a water-resistant coating, durable water-resistant coating. In some embodiments, the interior and exterior surfaces of the lid 40 are also be protected in a similar manner. The interior coating provides a moisture barrier that protects the interior of the box 12 from cat urine. An exterior coating can also be applied to the outer surfaces of the box 12 if desired to protect the box 12 from moisture damage during home delivery. In one embodiment, the box 12 measures 19" L×14⅜" W×3"H (disassembled) and 19" L×14" W×10¼" H (assembled).

Figure 8:
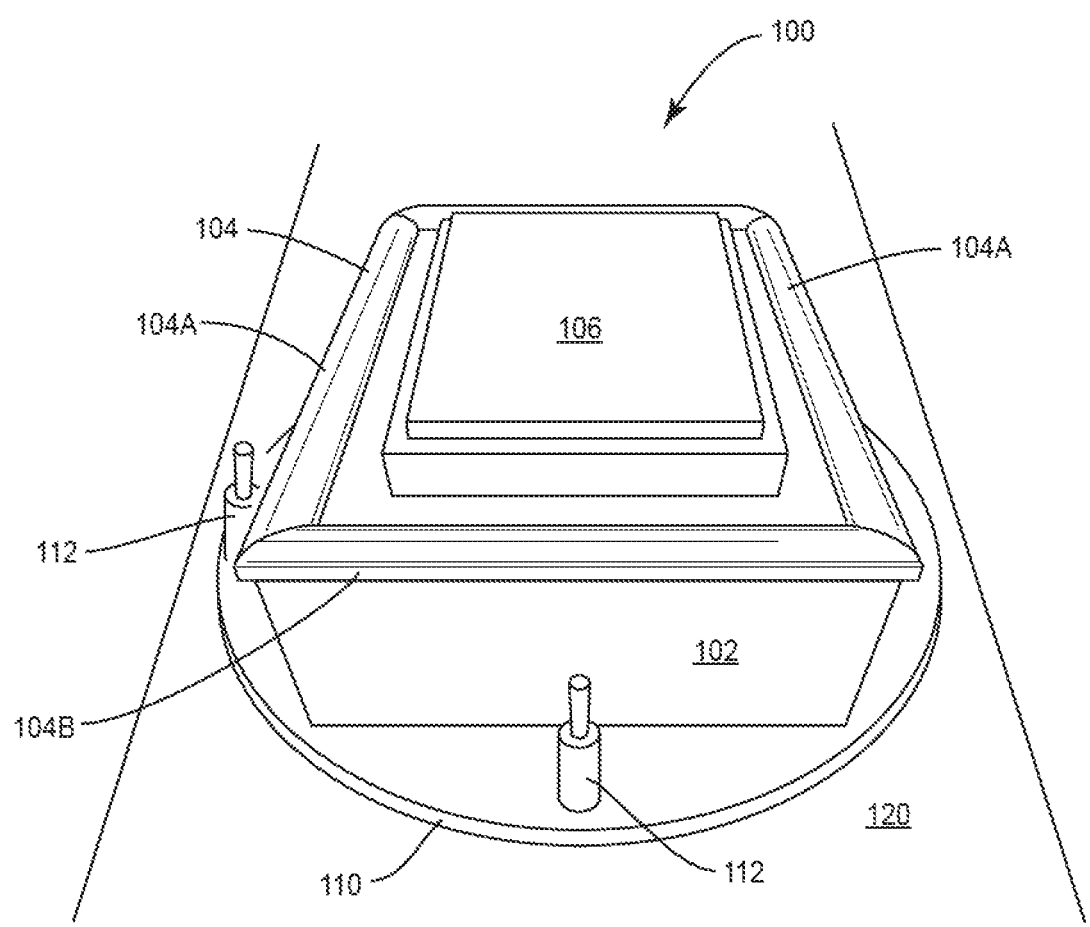
FIG. 8 is a perspective view of a mold used in the manufacture of the cat litter box.
Figure 9:
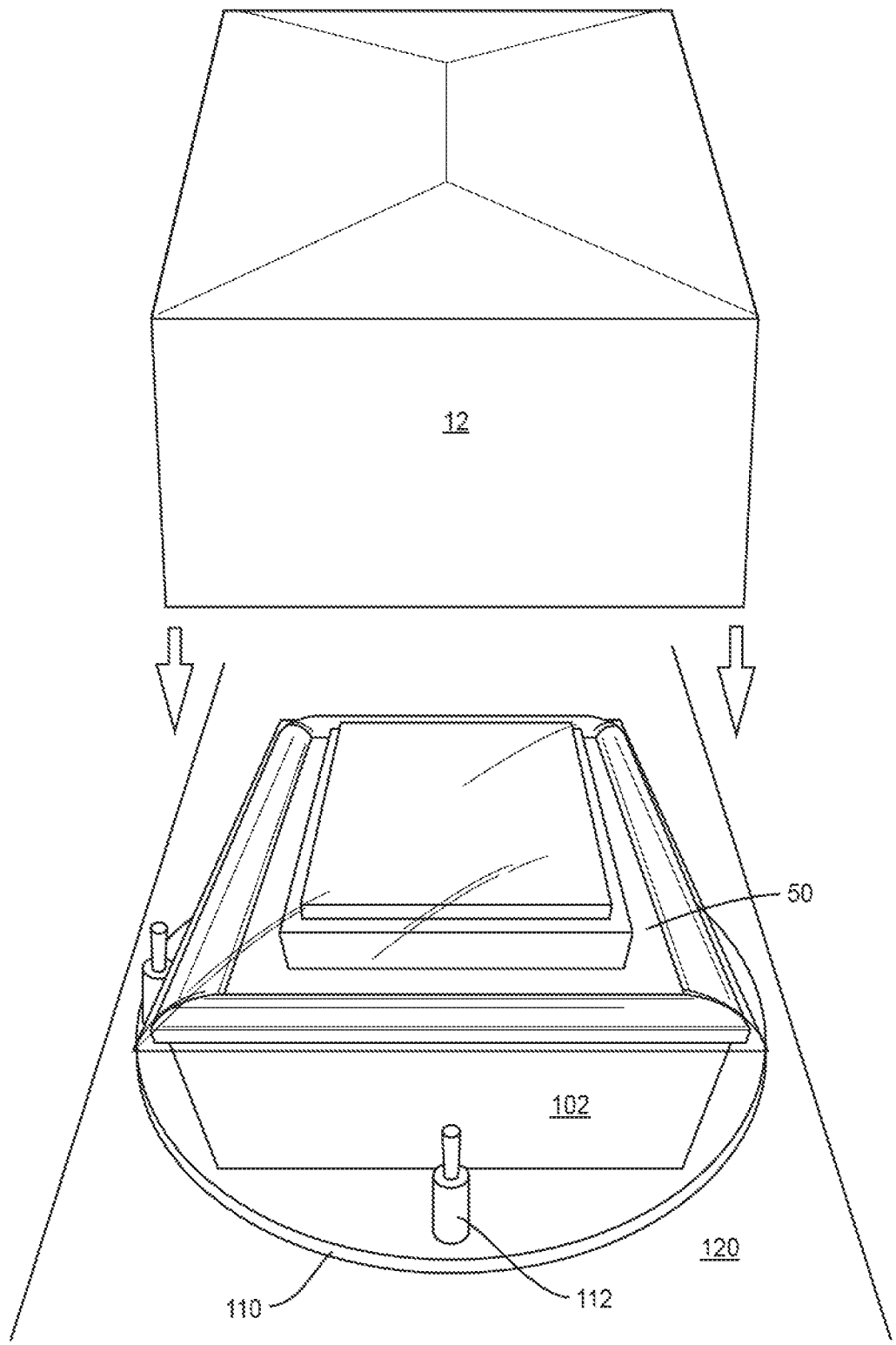
FIG. 9 is a perspective view of the cat litter box being placed on the mold.
Figure 10:
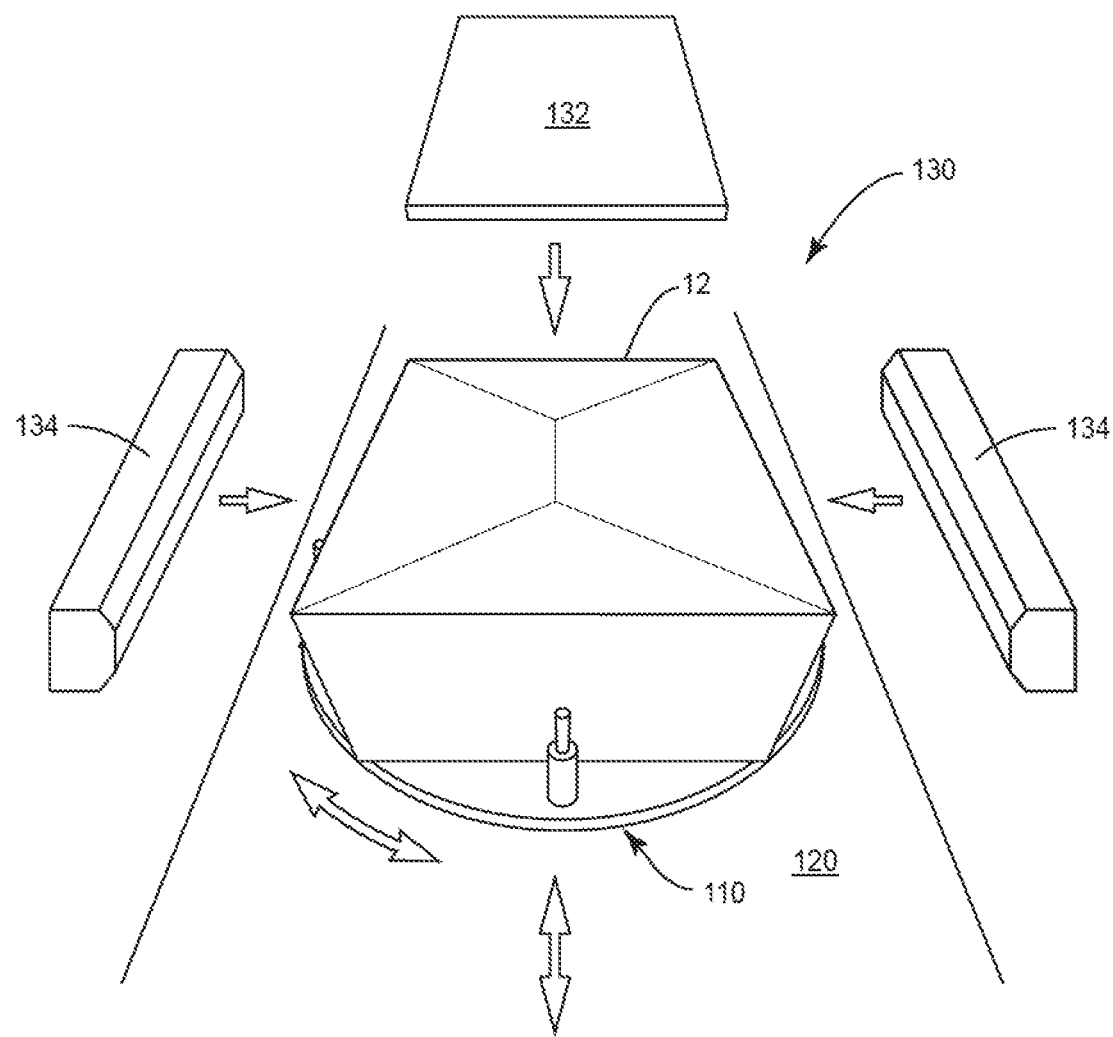
FIG. 10 is a perspective view illustrating a method adhering the cat litter tray to the interior of the cat litter box by simultaneous application of heat and pressure to the exterior of the box.

FIGS. 8-10 illustrate an exemplary method of manufacturing the cat litter box 10. Generally, the box 12 is assembled from the blank shown in FIG. 6 after a water-resistant coating is applied interior and exterior surfaces of the box 12. A second coating of a heat-activated adhesive is applied over the water-resistant coating to the inner surfaces of the side walls 16 where the side walls 16 are contacted by the flanges 58 of the cat litter tray 50. The cat litter tray 50 and box 12 are then placed on a mold while heat and pressure are simultaneously applied to the outer surfaces of the box 12. The pressure ensures that good contact is made between the flanges 58 of the cat litter tray 50 and the side walls 16 of the cat litter box 10 while heat is simultaneously transferred through the box material to activate the adhesive.

FIG. 8 illustrates an exemplary mold 100 used in the manufacture of the cat litter box 10. The mold 100 comprises a base 102 and a curved frame 104 that conforms to the interior shape of the cat litter tray 50. The frame 104 includes curved portions 104A configured to contact the inner surfaces of the side walls 56 of the cat litter tray 50 and flat, outwardly facing surfaces 104B configured to contact the interior side of the flanges 58 of the cat litter tray 50. A raised surface 106 extends upward from the center of the base 102 to contact the inner surface of the bottom 54 of the cat litter tray 50. In one embodiment, the raised surface 106 comprises a cork material.

The mold 100 is mounted on a carrousel 110 that rotates 90%. The carrousel 110 includes two handles 112 for rotating the carrousel 110 as hereinafter described. The carrousel 110 in turn is mounted on a shuttle 120 that moves forward and backward into and out of a heating machine 130, shown schematically in FIG. 10.

During manufacture, the cat litter tray 50 is placed in an inverted position on the mold 110 and the box 12 is pressed down over the cat litter tray 50 as shown in FIG. 9. After the cat litter tray 50 and box 12 are placed on the mold 100, the carrousel 110 is pushed forward into the heating machine 130. The heating machine 130 comprises a pressure plate 132 that presses down in the bottom 14 of the box 12 to ensure that the cat litter tray 50 and box 12 are properly positioned on the mold 100. Heating bars 134 then move inwardly to simultaneously contact two opposing side walls 16 of the box 12. The heating bars 134 apply pressure in the range of about 80 to 125 lbs/in$^2$. The applied pressure ensures that good contact is made between the flanges 58 of the cat litter tray 50 and the side walls 16 of the cat litter box 10, while heat in the range of about 100 degrees to 400 degrees Fahrenheit is simultaneously applied to the outer surface of the box 12. The heat transferred through the box material activates the adhesive coating on the side walls 16 to adhere the flanges 58 of the cat litter tray 50 to the side walls 16. The amount of the applied pressure and heat will vary depending on the characteristics of the box material and the type of the adhesive coating. The pressure and heat are applied until the adhesive coating is activated, which can occur in under 10 seconds depending on the materials. After the cat litter tray 50 is adhered to the first two sides of the cat litter box 10, the carrousel 110 is retracted from the heating machine 130, rotated 90%, and then pushed back into the heating machine 130 to adhere the cat litter tray 50 to the remaining two side walls 16 as described above.

In use, the cat litter box 10 pre-packaged with cat litter 70 is purchased by or shipped to a user in a folded configuration as shown in FIG. 1. The reinforcing strips 60 strips along with a bag of cat litter 70 are enclosed inside the box 12. In one embodiment, the cat litter 70 comprises a silica gel bead that varies in size from about 3 mm to about 8 mm in diameter. The cat litter 70 is packaged inside a sealed bag with an easy to open tear strip for the customer's use. The sealed bag keeps any moisture from coming in contact with the cat litter 70 prior to its use as a litter.

Figure 3:
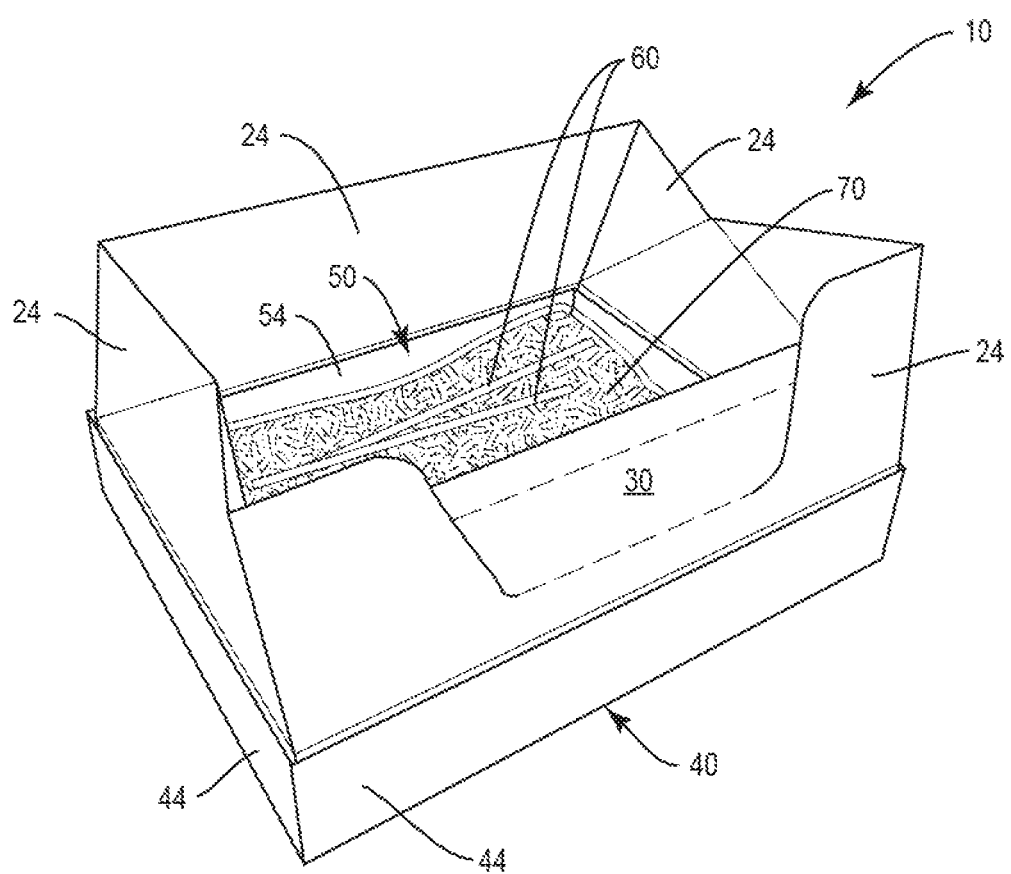
FIG. 3 is a perspective view of the cat litter box with the lid placed on the bottom and the extension panels partially unfolded.
Figure 4:
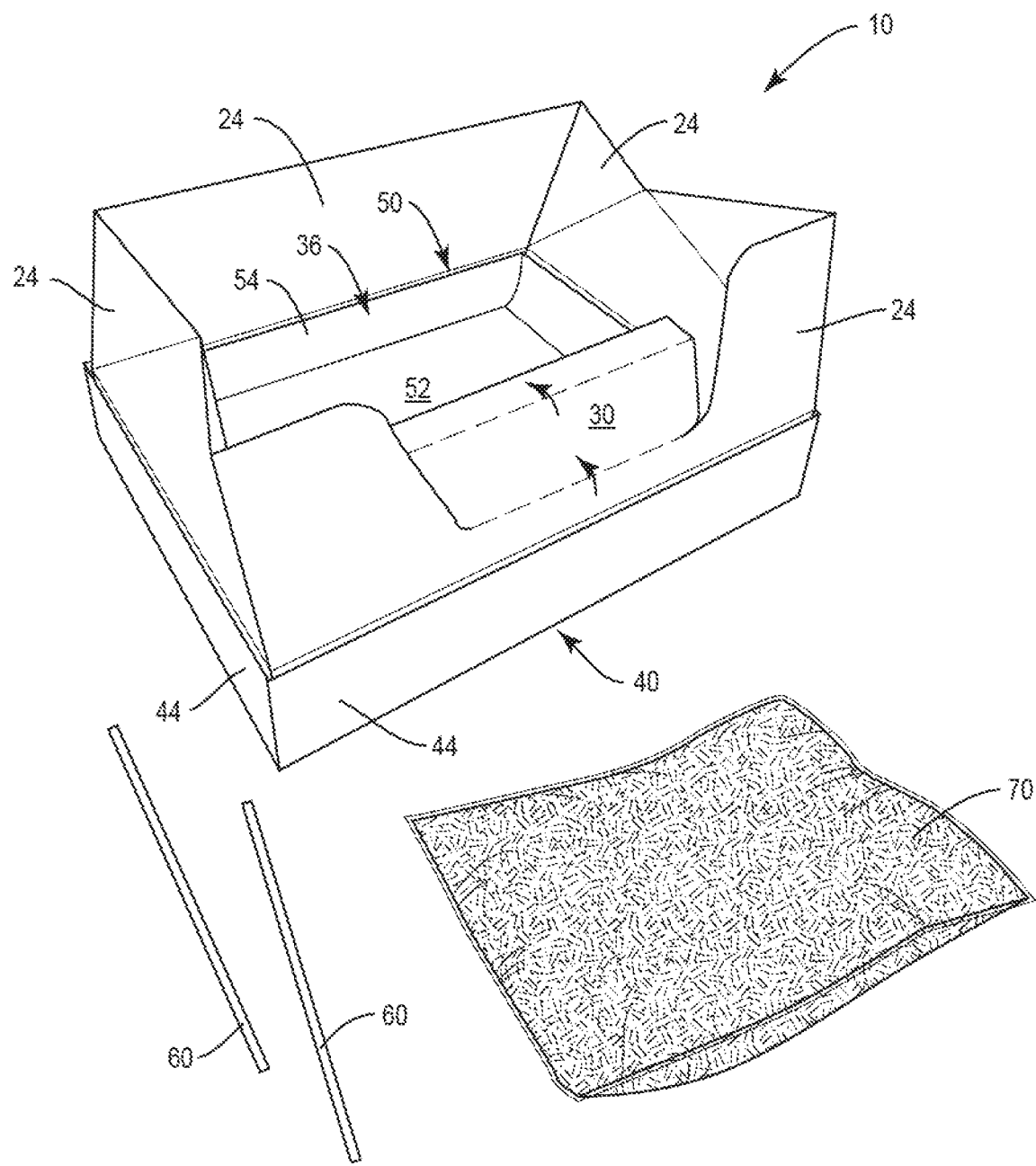
FIG. 4 is a perspective view of the cat litter box with the lid placed on the bottom and the contents removed.

To put the cat litter box 10 into use, the customer removes the lid 40 from the folded box 12, folds the extension panels 24 upward and outward to the unfolded position as shown in FIGS. 3 and 4, and places the reinforcing strips 60 provided on the top edges of the side panels 24A and 24C to lock the cat litter box 10 into the final operational position as shown in FIG. 5. The perforated cut-out 30 can either be removed and discarded or folded down inside the cat litter box 10 to provide an opening for the cat to enter into and exit from the cat litter box 10. The lid 40 may be stored by placing it under the cat litter box 10 as shown, or may be placed on top for use as a cover.

After approximately 30 days of use, the cat litter box 10 is ready to be properly disposed of. The reinforcing strips 60 are removed and placed inside the cat litter tray 50 or otherwise disposed of. The litter box is the folded back into the original folded position and the lid 40 is placed back on the top of the cat litter box 10 as shown in FIG. 1 for disposal.

What is claimed is:

1. A cat litter box comprising:
    a bottom;
    side walls extending upwardly from the bottom to form a litter compartment;
    a cat litter tray disposed in the litter compartment, wherein the cat litter tray is shaped to conform to an interior space of the litter compartment and includes an outer periphery that is sealed to the inner surfaces of the side walls;
    extension panels hingedly connected to respective side walls and configured to move between a folded position in which the cat litter compartment is enclosed by the extension panels and an unfolded position in which the extension panels extend upward from the side walls to form an extended litter compartment with the extension panels hingedly connected together and form a continuous wall that extends around the litter compartment in the unfolded position; and
    an opening in one of the extension panels to enable a cat to enter into and exit from the extended litter compartment when the sidewalls are in the unfolded position.

2. The cat litter box of claim 1 further comprising a lid configured to be inserted over the side walls of the cat litter box when the extension panels are in the folded position.

3. The cat litter box of claim 1 further comprising a water-resistant coating applied to inner surfaces of the side walls and extension panels.

4. The cat litter box of claim 3 wherein the outer periphery of the cat litter box is sealed to the inner surface of the side walls by an adhesive coating applied over the water-resistant coating.

5. The cat litter box of claim 1 further comprising one or more reinforcing members to hold the extension panels in the unfolded position.

6. The cat litter box of claim 1 wherein the cat litter box is rectangular in form and includes four side walls joined at the four corners of the cat litter box.

7. The cat litter box of claim 6 comprising four extension panels hingedly connected to respective side walls and configured to fold inwardly from the unfolded position to the folded position.

8. The cat litter box of claim 1 wherein each of the extension panels is connected to at least one adjacent extension panel.

9. The cat litter box of claim 8 wherein one of the extension panels comprises a tab that overlaps with one of the adjacent extension panels.

10. The cat litter box of claim 8 wherein each of the extension panels shares a fold line with one of the adjacent extension panels.

11. The cat litter box of claim 8 wherein the fold lines extend completely across the extension panels from a first side at the side walls to an exposed edge of the extension panels.

12. A method of manufacturing a cat litter box, the method comprising:
    providing a box having a bottom and side walls forming a litter compartment and extension panels hingedly connected to the side walls;
    applying a heat-activated adhesive coating to the inner surface of side walls;
    disposing a cat litter tray in the litter compartment;
    pressing the side walls into contact with the perimeter of the cat litter tray while applying heat to the side walls to activate the adhesive and adhere the cat litter tray to the inner surface of the side walls with the extension panels extending continuously without gaps around the cat litter tray and extending outward above a top of the cat litter tray.

13. A cat litter box comprising:
    a bottom;
    side walls extending upwardly from the bottom to form a litter compartment;
    extension panels hingedly connected to respective side walls and configured to move between a folded position in which the cat litter compartment is enclosed by the extension panels and an unfolded position in which the extension panels extend upward from the side walls to form an extended litter compartment with the extension panels connected together to form a continuous barrier without gaps; and
    an opening that extends into an exposed upward edge of one of the extension panels to enable a cat to enter into and exit from the extended litter compartment when the side walls and the extension panels are in the unfolded position.

14. The cat litter box of claim 13 wherein the extension panels are hingedly connected together at fold lines that extend across an entirety of the extension panels.

15. The cat litter box of claim 14 wherein each of the fold lines is shared by two adjacent extension panels.

16. The cat litter box of claim 13 wherein each of the extension panels is connected to at least one adjacent extension panel.

17. The cat litter box of claim 13 wherein one of the extension panels comprises a tab that overlaps with one of the adjacent extension panels.

18. The cat litter box of claim 13 further comprising a lid configured to be inserted over the sidewalls of the cat litter box when the extension panels are in the folded position.

19. The cat litter box of claim 13 further comprising one or more reinforcing members to hold the extension panels in the unfolded position.

20. The cat litter box of claim 13 wherein the cat litter box is rectangular in form and comprises four extension panels that are hingedly connected at four corners of the cat litter box.

* * * * *